United States Patent
Stephens

(10) Patent No.: US 7,700,069 B2
(45) Date of Patent: Apr. 20, 2010

(54) ACTIVATION OF METAL HYDRIDES

(75) Inventor: Robert D. Stephens, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/177,449

(22) Filed: Jul. 22, 2008

(65) Prior Publication Data

US 2009/0028782 A1    Jan. 29, 2009

Related U.S. Application Data

(60) Provisional application No. 60/952,293, filed on Jul. 27, 2007.

(51) Int. Cl.
    *C01B 3/04*   (2006.01)
(52) U.S. Cl. .................. 423/644; 423/645; 423/648.1; 423/658.2; 261/151; 429/218.2
(58) Field of Classification Search .............. 423/644, 423/645; 261/151; 429/218.2
    See application file for complete search history.

(56) References Cited

U.S. PATENT DOCUMENTS

| | | | |
|---|---|---|---|
| 5,953,922 A | * | 9/1999 | Stetson et al. ............... 62/46.2 |
| 6,080,381 A | * | 6/2000 | Zaluska et al. ........... 423/648.1 |
| 6,569,567 B1 | * | 5/2003 | Reichman et al. ......... 429/218.2 |
| 7,141,216 B2 | | 11/2006 | Stephens |
| 2008/0042305 A1 | * | 2/2008 | Halalay ...................... 261/151 |

FOREIGN PATENT DOCUMENTS

EP    0355207    *  2/1990
JP    2002233857 A  *  8/2002

OTHER PUBLICATIONS

Suslick, Kenneth S., Handbook of Heterogeneous Catalysis, Part A, Chapter 8.6 Sonocatalysis, edited by Ertl, et al., 1997.

* cited by examiner

*Primary Examiner*—Melvin C Mayes
*Assistant Examiner*—Jun Li
(74) *Attorney, Agent, or Firm*—Reising Ethington P.C.

(57) ABSTRACT

Some metal hydrides permit reversible storage and release of hydrogen for a hydrogen using power-generator. But the surfaces of some metal hydrides or metal hydride precursors may be oxidized or have other coatings that inhibit hydrogen absorption or release. Such materials may be suspended in a suitable liquid of supercritical carbon dioxide or liquid nitrogen and subjected to cavitation processing to break up such hydrogen impermeable surfaces or to fracture the particles so as to provide fresh hydrogen penetratable surfaces.

9 Claims, 2 Drawing Sheets

ACTIVATION OF METAL HYDRIDES

This application claims priority based on provisional application 60/952,293, titled "Activation of Metal Hydrides," filed Jul. 27, 2007 and which is incorporated herein by reference.

TECHNICAL FIELD

This disclosure pertains to the treatment of surfaces of metal hydride particles to activate the particles for storage or release of hydrogen. More specifically, this disclosure pertains to such activation of metal hydride particles by suspending them in a suitably inert liquid and subjecting them to cavitation to produce hydrogen permeable surfaces.

BACKGROUND OF THE INVENTION

In the context of this disclosure metal hydrides are elements and alloys or intermetallic compounds of elements that are capable of reversibly absorbing hydrogen. As used herein, the terms metal hydride and metal hydride alloy refer to both metal alloys in a non-hydrided state, sometimes referred to as metal hydriding alloys, and also to metal alloys in a hydrided state, which include the metal alloys with hydrogen. These metal hydride alloys may take shape as solid solution alloys or as intermetallic compounds. The hydrogen is incorporated within a matrix of metal atoms for storage in solid conditions. The matrix may comprise a lattice of a metal crystal structure, and the hydrogen atoms become interspersed between the metal atoms.

Metal hydride alloys are useful, for example, for the storage of hydrogen for fuel cells and other hydrogen-consuming power plants for automotive vehicles. Hydrogen may be absorbed in a non-hydrided metal composition (metal hydride precursor) by cooling the precursor material to a suitable, relatively cold, storage temperature and contacting it with hydrogen gas under a suitable, usually relatively high pressure. The hydrided metal hydride material is stored (often on a vehicle) until hydrogen is required. The metal hydride is then heated and hydrogen is released into a delivery system for providing hydrogen to a device (often an on-board device) that utilizes it.

Examples of combinations of metal(s) and corresponding hydrides include Pd and $PdH_{0.6}$, $LaNi_5$ and $LaNi_5H_7$, $ZrV_2$ and $ZrV_2H_{5.5}$, FeTi and $FeTiH_2$, and $Mg_2Ni$ and $Mg_2NiH_4$.

In practice, many metal hydride precursors may not readily absorb and store hydrogen. The particles require a pre-treatment before they take up hydrogen. The pretreatment (sometimes called "activation") involves removing oxide films (or other hydrogen impermeable films) on the metal particles or fracturing some of the particles to expose un-oxidized surfaces for absorption of hydrogen. Such practices have included cooling the particles, pressurizing with hydrogen, heating, and depressurizing the particles to chemically remove oxide barriers to hydrogen absorption. Repeated cycling has sometimes been required.

There is a need for a less costly and time consuming practice for activation of hydrogen storage materials.

SUMMARY OF THE INVENTION

Particles of a metal hydride material, or of a metal hydride precursor, may be evaluated to see if they are susceptible for absorption or desorption of hydrogen. If it is determined that surfaces of the particles are occluded or otherwise preventing hydrogen exchange, the particles may be treated as follows.

Metal particles (or metal hydride particles) are dispersed in a suitably inert liquid (e.g., non-oxidizing liquid) and the particle-liquid mixture is subjected to cavitation by a suitable cavitation actuator. An ultrasonic generator is often suitable for producing cavitation. Cavitation is the sudden formation and collapse of low pressure bubbles in the liquid, typically by mechanical forces. The liquid composition must tolerate application of ultrasonic mechanical energy and should not cause interference with subsequent hydrogen absorption by treated particles. The liquid and hydride particle mixture is contained in a vessel for cavitation of the mixture. The cavitation of the liquid is conducted to cause ablation of the oxide (or other inhibiting coating) on the surfaces of the particles. The cavitation may also cause fracturing of the metal or metal hydride particles to expose fresh, non-occluded surfaces for absorption or release of hydrogen.

The vessel may be adapted to provide a protective atmosphere if the cavitation mixture requires it. Further, the vessel may be adapted for release of hydrogen from the treated particles or for injection of hydrogen to be absorbed by the particles. In many embodiments of the invention, the initial liquid-hydride particle mixture will be at a temperature (or temperature range) as determined as suitable for effective treatment of the particles when using a specific liquid suspending material. This temperature may be at an ambient temperature (typically in the range of about 17° C. to about 25° C.). Some temperature increase may be caused by the cavitation processing. The vessel may be adapted with a system for desired temperature control of the liquid and particle mixture during the cavitation process.

Examples of suitable liquid treatment mediums include supercritical carbon dioxide and liquid nitrogen. These liquids will require containing vessels capable of maintaining temperatures and pressures for retaining these fluids in a cavitation mode. An advantage of these cavitation liquids is that they may be readily vaporized from the activated metal or hydride particles. Other suitable liquids include non-aqueous, organic liquids that are inert with respect to the particles and allow cavitation at close-to-ambient temperatures or other desired temperatures.

At the completion of cavitation activation of the particles, the liquid may be separated from the activated particles and the particles used in their hydrogen storage function. Hydrogen may be added to or removed from the activated particles. In other embodiments of the invention, hydrogen may be added to or removed from the activated particles while the particles are still suspended in the liquid.

Some metal-metal hydride combinations are capable of storing or releasing abundant quantities of hydrogen by varying the pressure of hydrogen to which they are exposed in a closed volume. Some metal hydride combinations release hydrogen under sufficiently high hydrogen pressure to facilitate transport of the released hydrogen from a hydride storage material to a nearby hydrogen consuming device. The practice of this invention is applicable to many metal hydrides including such high pressure metal hydrides.

Other objects and advantages of the invention will be apparent following a further description of preferred embodiments of the invention.

BRIEF DESCRIPTION OF THE DRAWINGS

In FIG. 1 the samples were maintained at constant temperatures of 0° C. and 40° C., respectively as hydrogen gas pressure was increased from very low pressure to about 4 megapascals and then slowly released.

DESCRIPTION OF PREFERRED EMBODIMENTS

The most promising chemical reactions for on-board $H_2$ storage are equilibrium reactions that alternately store and release $H_2$ according to the phase, temperature and pressure of the system. One class of such chemical reactions is those involving metal hydrides. Metal hydrides undergo reversible chemical reactions which, under conditions of temperature and pressure that are sometimes suitable for on-board vehicles, either absorb or release hydrogen. The parent metallics of metal hydrides typically take any of the following forms: A, $AB_5$, $AB_2$, AB, $A_2B$ where A and B are typically a mix of transition metals, or a mix of transition with either rare earth or alkaline earth metals. Table I shows examples of metal hydrides and their hydrogen storage properties.

TABLE I

Examples of metal hydrides with known hydrogen storage properties

| Type | Metal | Hydride | Structure | Mass % $H_2$ | $P_{eq}$, T |
|------|-------|---------|-----------|--------------|-------------|
| A | Pd | $PdH_{0.6}$ | Fm3m | 0.56 | 0.02 bar, 298 K |
| $AB_5$ | $LaNi_5$ | $LaNi_5H_7$ | P6/mmm | 1.37 | 2 bar, 298 K |
| $AB_2$ | $ZrV_2$ | $ZrV_2H_{5.5}$ | Fd3m | 3.01 | $10^{-8}$ bar, 303 K |
| AB | FeTi | $FeTiH_2$ | Pm3m | 1.89 | 5 bar, 303 K |
| $A_2B$ | $Mg_2Ni$ | $Mg_2NiH_4$ | P6222 | 3.59 | 1 bar 555 K |

The formation of a metal hydride from the reaction of hydrogen with a parent metallic(s) proceeds by a set of well characterized processes. Hydrogen molecules first dissociate on the surface before the dissociated hydrogen dissolves in the host metal, residing in the interstitial sites of the host metal crystal structure. But the molecular hydrogen must be able to contact the surface of pure metal hydride for dissociation and dissolution to take place. In other words the surface of a metal hydride precursor material must be free of films that inhibit hydrogen absorption.

Figure 1:
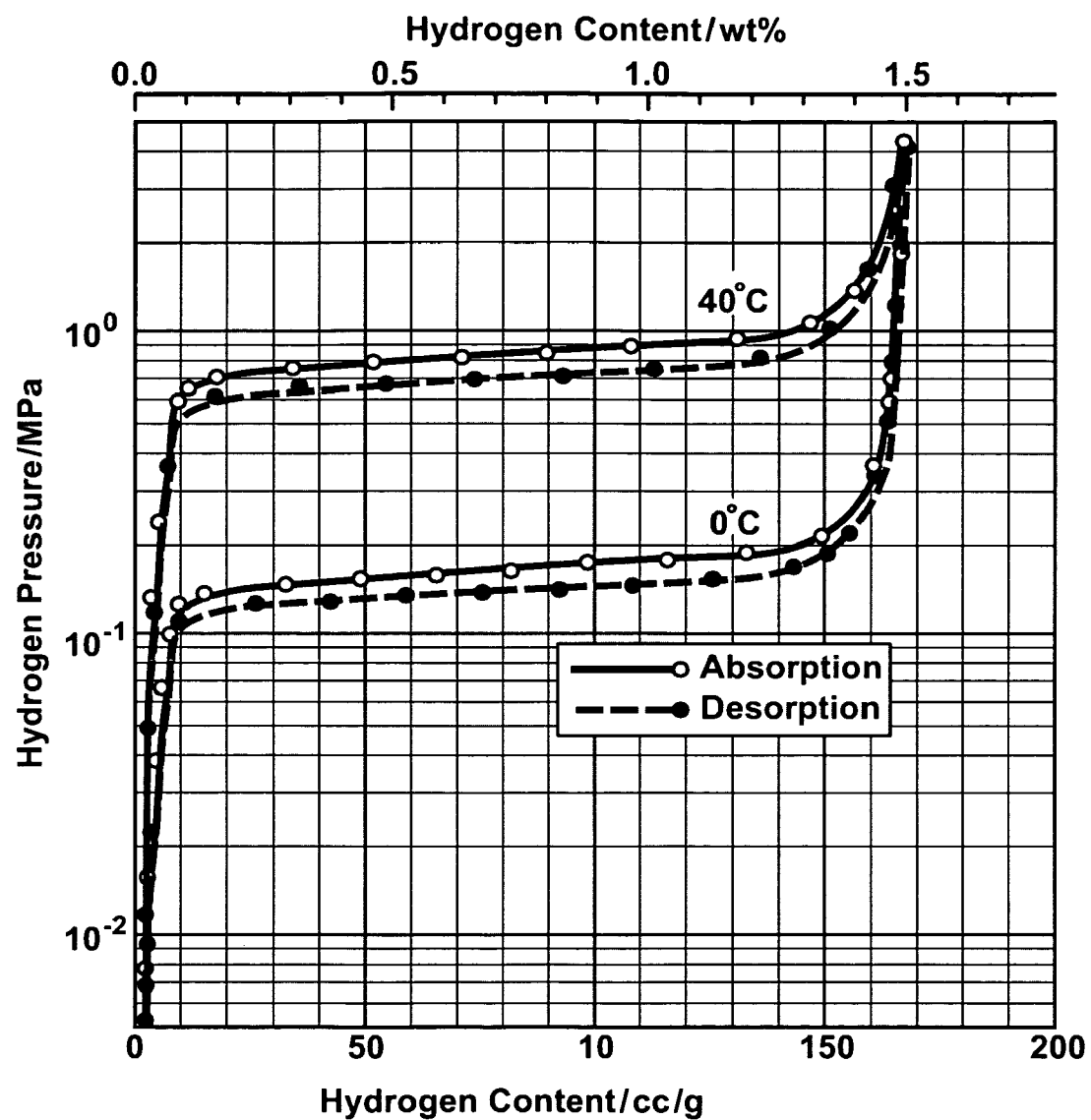
FIG. 1 is a hydrogen pressure-hydrogen content isotherm for a typical AB5 type metal hydride.

At higher hydrogen pressure the concentration of dissolved hydrogen increases and the inter-hydrogen distance decreases as increasing numbers of interstitial sites are filled. At any given temperature and pressure, hydride formation will proceed until the material is fully hydrided, at which point an increasing hydrogen gas concentration can create no additional hydride and the pressure rises. These steps can be illustrated with pressure-composition-isotherms, an example of which is shown in FIG. 1. In these examples, at 0° C. and 40° C., it is seen that higher hydrogen pressures are required to achieve equivalent hydrogen absorption in the hydrogen storage composition. However, at even higher pressures, different interstitial sites can become populated, consequently forming other phases of the metal hydride. For many of the known metal hydrides, the thermodynamics of the interstitial sites amenable for hydrogen storage at higher hydrogen pressures are either not known or remain to be investigated.

The examples of metal hydrides shown in Table I are binary and ternary types, which are typically expressed in the forms $AH_x$, $A_2BH_x$, and ABnHx. Quaternary metal hydrides also exist, exemplified by the general form of $AB_nC_mH_x$. Consequently, there are nearly limitless numbers of potential metal hydrides that can be explored.

One example of a classic metal hydride shown in Table I is $LaNi_5H_7$. The formation of this hydride is one that takes place at moderate pressures and temperatures, as shown in Table I. This hydride has a relatively low heat of formation; therefore the energy required for hydrogen release is low. Further, it releases hydrogen at relatively low temperatures allowing it to utilize waste heat from a fuel cell to release the hydrogen. Consequently, the uptake and release of hydrogen takes place under conditions that are favorable for vehicle on-board hydrogen storage, and the parasitic loss associated with the release of hydrogen from this hydride is low.

Thus, metal hydrides composed of many different combinations of different metals are available and are being developed for their potential to store hydrogen. But sometimes these materials must be "activated before their potential to store and release hydrogen is fully realized. The activation process often involves removing oxide coatings from the hydride or hydride precursor material and/or exposing fresh un-oxidized portions of the material. The activation processes that have been used have been complex, time consuming, and costly. For example, one process uses temperature and pressure cycling to activate a high pressure metal hydride. In the process each cycle consisted of cooling the metal hydride to −190° C. and pressurization to 175 bar with hydrogen, followed by heating the metal hydride to 350° C. while evacuating the chamber to a vacuum. Multiple such heating/pressurizing and cooling/evacuation cycles are required for activation. Another activation process consisted of prolonged heating of the metal hydride at 1200° C.

Irradiation of a liquid with, for example, ultrasound induces cavitation. Ultrasonically induced cavitation creates bubbles in the liquid that can reach 5000 degrees K and pressures up to 1000 atmospheres. These bubbles will form on surfaces of solids that are suspended or present within the cavitation medium. Bubbles generated via cavitation have been shown to undergo growth during cyclic expansion and compression due to rarefaction and compressive portions of the ultrasonic waves in liquid media. Bubbles eventually reach an unstable size and undergo a violent collapse at the solid surface. During bubble collapse, the liquid medium forms a liquid jet directed at the solid surface that reaches velocities of hundreds of meters per second. Such liquid jets have been described as having "shape charged" effects that are ablative to the surface of the solid. The forces of this collapse are sufficient to ablate oxide layers from some metals and to fracture brittle particles.

Consequently, this effect is precisely the result necessary for the activation of metal hydrides and their precursors. This invention utilizes a non-aqueous media in which cavitation is induced via an ultrasonic generator. Metal or metal hydride particles are suspended in the cavitation medium. Bubbles generated via cavitation in the medium form on the particulate surfaces and the implosive collapse of these bubbles on the surfaces of the particles cause the ablation of the oxide layer and thereby expose fresh, un-oxidized surfaces of the hydrogen storage materials. The surfaces of the particles are also fractured by the force of the liquid jet against the surfaces, thereby increasing their surface area. The removal of oxide layers and increased surface areas serve to activate the materials for hydrogen uptake and release.

Figure 2:
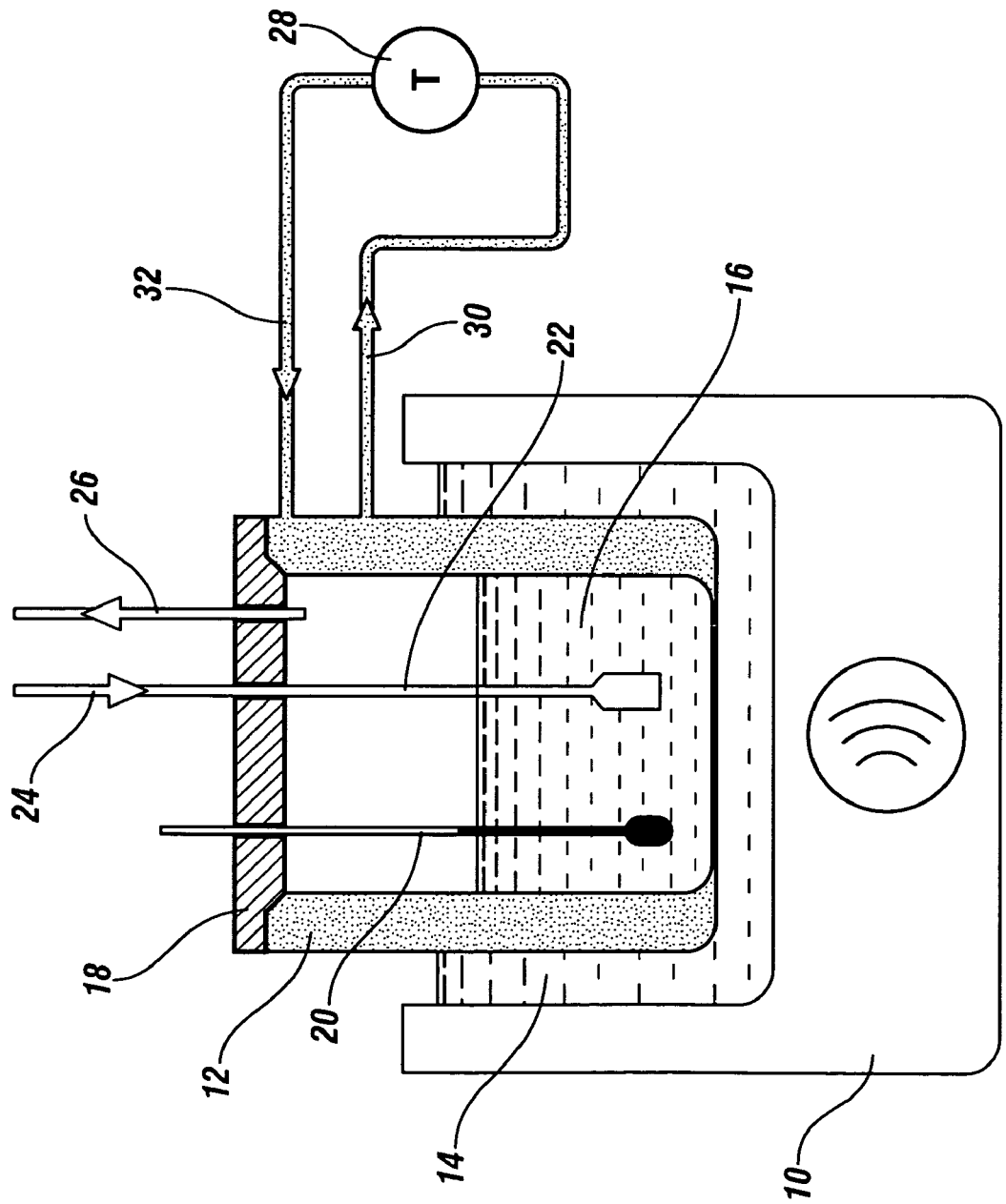
FIG. 2 is a schematic illustration of a cavitation apparatus for activation of metal hydride particles or metal particles that are precursors for metal hydrides.

FIG. 2 illustrates a laboratory cavitation apparatus using an ultrasonic generator to induce cavitation in a metal hydride precursor particle (and/or metal hydride particle)—liquid mixture. Referring to FIG. 2, an ultrasonic generator includes an ultrasonic vibrator container 10 with a liquid bath 14 for transmitting ultrasonic vibration energy to a jacketed cavitation vessel 12. A metal hydride particle-liquid mixture 16 is contained within cavitation vessel 12. The top of cavitation vessel 12 is closed with a hermetic lid 18 which enables pass-through of thermometer 20, gas sparger 22 for a gas inlet 24 (if desired), and gas outlet 26. The optional gas inlet 24 and gas outlet 26 may be used for providing a protective gas atmosphere, such as argon, over the contents of the cavitation vessel. Or the inlet and outlet may be used for the introduction or removal of hydrogen to vessel 12. Cavitation vessel 12 is jacketed, and temperature control of vessel 12 is accomplished using thermostat-controlled (thermostat 8) fluid circulating lines 30 and 32.

A suitable cavitation liquid is selected for cavitation processing of the hydrogen storage particles. The composition of the liquid does not adversely affect the particles during cavitation and is suitably fluid for cavitation processing at the desired processing temperature. And the liquid is easily removed from the particles at the completion of the processing.

Cavitation vessels are designed or adapted for cavitation treatment of the metal hydride precursor particles or metal hydride particles. The cavitation processing will often be performed on a batch of particles and the vessel shaped accordingly. But a cavitation reaction could also be conducted in a flow-through vessel on a semi-continuous or continuous basis. The vessel is sized to accommodate the cavitation liquid and particle mass. As stated above, the cavitation vessel may require heating or cooling depending on the selection of the cavitation liquid and the temperature at which the cavitation process is undertaken. Provision is made to admit the untreated liquid-particle mixture to the vessel and to remove the activated mixture from the vessel under a suitable non-oxidizing atmosphere. Provision may also be made for admission of a protective atmosphere to the vessel or for admission or removal of hydrogen if such processing is conducted while the cavitation mixture is in the cavitation vessel.

An ultrasonic generator (or other cavitation device) is used in combination with the cavitation vessel. The ultrasonic generator may act on a wall or surface of the vessel, as illustrated in FIG. 2, to induce ultrasonic frequency vibrations into the cavitation mixture in the vessel. In another embodiment, the ultrasonic generator may have a horn or other transducer extending into the cavitation vessel for direct contact with the liquid particle-mixture.

While an ultrasonic generator is a convenient tool for inducing cavitation in an activation process for metal hydrides, other cavitation producing means may be employed for such activation processing. Cavitation may also be induced by pumps, propellers or other techniques that cause localized reductions in pressures of the cavitation medium to levels below the vapor pressure of the medium.

Practices of the invention have described by some illustrations which are not intended to limit the scope of the invention.

The invention claimed is:

1. A method of treating metal hydride particles or particles of metals that are metal hydride precursors when such particles have surface films that inhibit release or absorption of hydrogen into or from the particles, the method comprising:
suspending the particles having surface films thereon in a liquid of supercritical carbon dioxide or liquid nitrogen and subjecting the liquid-particle mixture to cavitation for breaking the surface films and/or fracturing at least some of the particles to remove the surface films and exposing new particle surfaces for hydrogen absorption or release.

2. A method as recited in claim 1 in which the liquid is a material that is not reactive with the suspended particles during cavitation to adversely affect subsequent hydrogen absorption or desorption.

3. A method as recited in claim 1 in which the liquid-particle mixture is subjected to ultrasonic frequency vibrations to subject the mixture to cavitation.

4. A method as recited in claim 1 in which the particles are metal hydride precursor materials and the cavitation processing is conducted to present new surfaces for hydrogen absorption into the precursor materials.

5. A method as recited in claim 1 in which the particles are metal hydride particles and the cavitation processing is conducted to present new surfaces for hydrogen release from the precursor materials.

6. A method as recited in claim 1 in which cavitation is started on a liquid particle mixture at temperature below ambient temperature.

7. A method as recited in claim 1 in which cavitation is staffed on a liquid particle mixture at temperature above or below ambient temperature and the temperature of the mixture being cavitated is thereafter controlled in a desired temperature range.

8. A method as set forth in claim 1 wherein at least some of the particles are fractured.

9. A method as set forth in claim 1 wherein the particles comprise at least one of Pd, PdH, $ZrV_2$, $ZrV_2H_{5.5}$, FeTi, $FeTiH_2$, or $LaNi_5$, $LaNi_5H_7$.

* * * * *